May 9, 1950   P. JEAN-MARIE T. ALLARD   2,507,292
WELL SINKING APPARATUS
Filed May 15, 1945
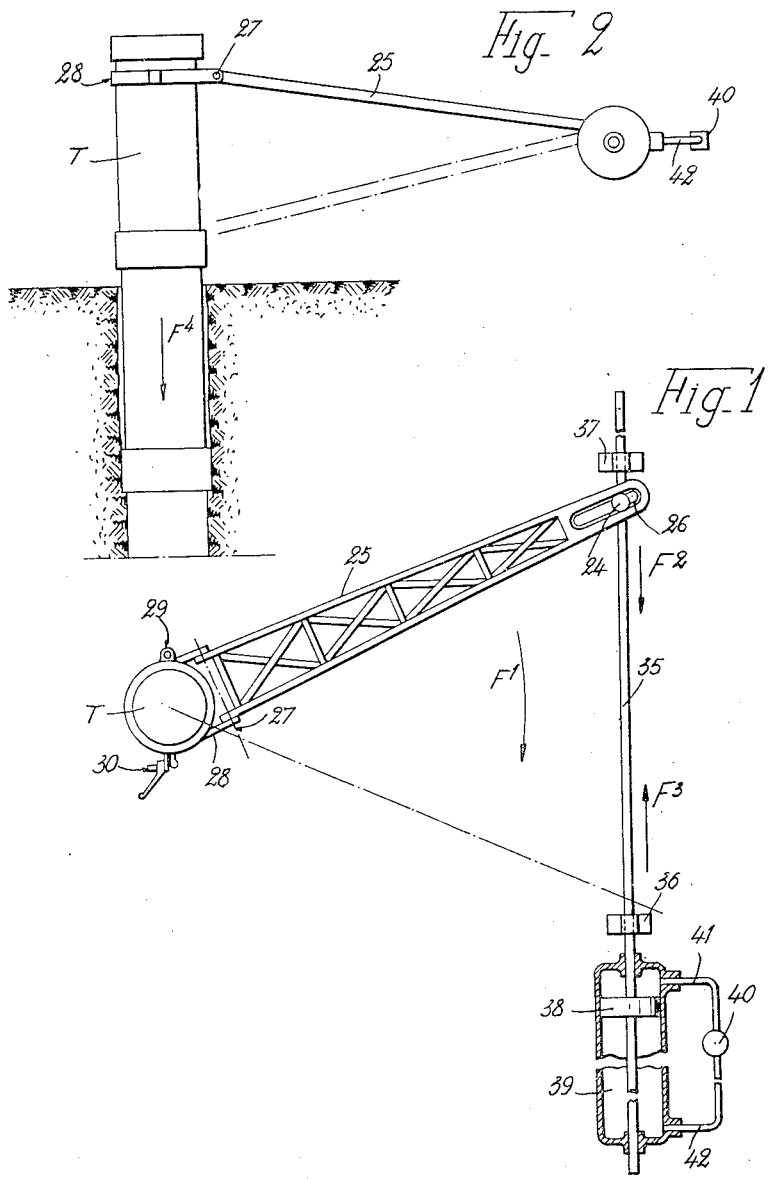
INVENTOR
PIERRE JEAN-MARIE THEODORE ALLARD
By Richardson and David
ATTY'S Patented May 9, 1950

2,507,292

UNITED STATES PATENT OFFICE 2,507,292

WELL SINKING APPARATUS

Pierre Jean-Marie Theodore Allard, Chantilly, France

Application May 15, 1945, Serial No. 593,824
In France June 2, 1942

Section 1, Public Law 690, August 8, 1946
Patent expires June 2, 1962

2 Claims. (Cl. 255—19)

Sinking of the caissons used in boring wells is difficult due to the friction of the soil. The present invention has for its object to facilitate such sinking and consists accordingly in imparting to the caisson an oscillatory motion.

The improved device comprises an operative lever of substantial length, one end of which is hinged to a collar removably attached to the caisson to be sunk, while the other end thereof is continuously oscillated or reciprocated by means of a suitable mechanism. The hinged connection between the operative lever and the collar is adapted to accommodate downward movement of the caisson with respect to the controlling mechanism. Further, the length of the lever is such as to keep the controlling mechanism away from the sinking tube, to add the weight of the lever in assisting the sinking process and to increase the torque exerted on the tube by the control mechanism, necessary to overcome the heavy friction of the caisson walls in the ground.

The controlling mechanism for the lever preferably consists of a hydraulic piston operated by compressed air or by steam, in order to impart to the caisson abrupt accelerations at each change of direction of the rotation.

In the accompanying drawing which shows by way of example a preferred embodiment of the invention:

Figs. 1 and 2 are respectively plan and elevational views of the upper portion of a caisson with the attached control lever and mechanism.

In the embodiment hereinafter described, a control lever 25 is attached to the sinking caisson, preferably by the device shown in Figs. 1 and 2, which comprises a collar 28 made fast to the caisson and connected with one end of said lever by means of a hinge 27. This clamping collar 28, frictionally mounted on the upper element T of the sinking caisson, is constituted by two halves pivotally connected at 29 and tightened together by a screw or bolt 30. The free end of the lever is reciprocated by a control mechanism which, in the embodiment shown in Figs. 1 and 2, consists of a hydraulic piston 38 at the end of a rod 35, slidably guided in bearings 36, 37 and carrying a roller 24 engaging a slot 26 of lever 25. Piston 38 is adapted to reciprocate in a cylinder 39 under the action of a liquid which is forced by a pump and distributor unit 40, alternately on each side of piston 38, through suitable pipes 41, 42. When lever 25 reaches one end of its stroke, the direction of rotation of the pump is reversed, automatically or not, thus reversing the movement of piston 38 and lever 25. Piston 38 may as well be driven by compressed air or steam. Thus, the sinking tube is subjected to continuous oscillations about its axis.

In operation, the lever imparts to the caisson continuous oscillations about its axis with abrupt changes of direction, due to the fluid operated piston, thus overcoming the heavy friction, while the weight of the lever, collar and caisson exert the necessary pressure to cause sinking of the caisson. Whenever necessary, further caisson sections are added on top of the already sunk portion, and the collar is slid upward and reclamped in its new position.

The loose soil is removed from the interior of the caisson by any conventional means such as a grab bucket.

Having now described my invention what I claim as new and desire to secure by Letters Patent is:

1. An apparatus for dry sinking a well caisson made up of superposed sections having a smooth exterior surface, the bottom section being open at its lower end forming a cutting edge, comprising a clamping member of substantial weight removably secured about said caisson, an elongated lever of substantial weight hinged at one end to said clamping member and at the other end to a driving means, said driving means comprising a reciprocable rod, a pin fixed on one end of said rod, said lever having an elongated slot therein adjacent said rod, said pin extending into said slot, means for reciprocating said rod to oscillate said lever and caisson, the weight of said clamping member and lever forcing said caisson into the earth as the caisson is oscillated.

2. An apparatus for dry sinking a well caisson of superposed sections having a smooth exterior surface, the bottom section, open at its lower end, forming a cutting edge, comprising a clamping member of substantial weight removably secured about said caisson, an elongated lever of substantial weight hinged at one end to said clamping member and at the other end to a driving means comprising a reciprocable rod, bearings at each end of same for supporting same, said lever having an elongated slot thereon adjacent said rod, said pin extending into said slot, a fluid pressure motor for reciprocating said rod to oscillate said lever and caisson, the weight of said clamping member and lever forcing said caisson into the earth as the caisson is oscillated.

PIERRE JEAN-MARIE THEODORE ALLARD.

REFERENCES CITED

The following references are of record in the file of this patent:

UNITED STATES PATENTS

| Number | Name | Date |
|---|---|---|
| 637,137 | Lucas | Nov. 14, 1899 |
| 984,827 | Ludlum | Feb. 21, 1911 |
| 1,050,533 | Hall | Jan. 14, 1913 |
| 1,386,220 | Anderson | Aug. 2, 1921 |
| 1,615,695 | Grattan | Jan. 25, 1927 |
| 1,959,174 | Moore | May 15, 1934 |
| 2,108,971 | Olsen et al. | Feb. 22, 1938 |